(No Model.)
J. L. TORREY.
SELF ADJUSTING HORSE COLLAR.
No. 568,887. Patented Oct. 6, 1896.
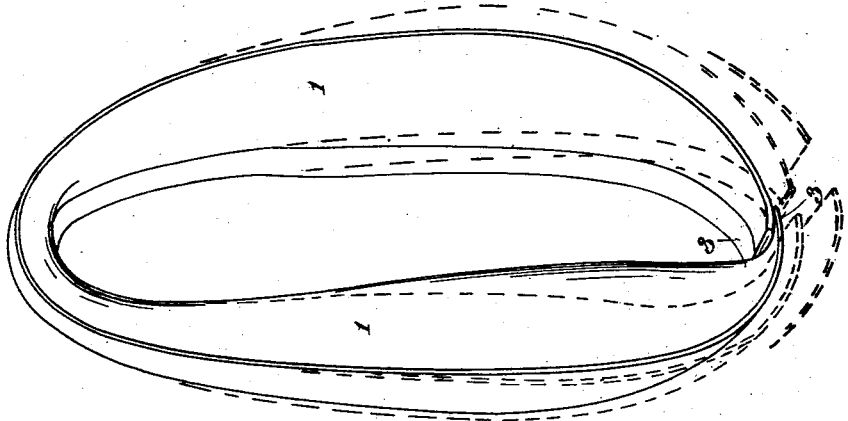
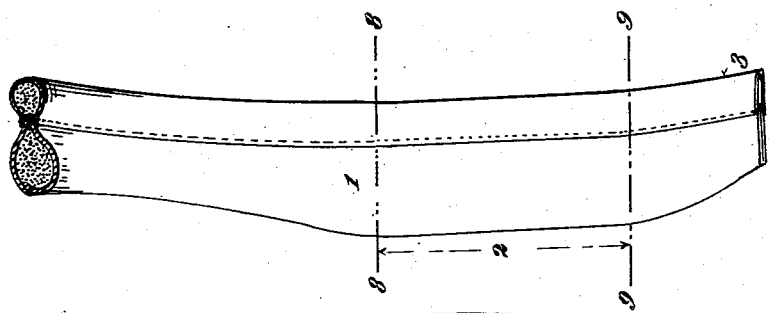
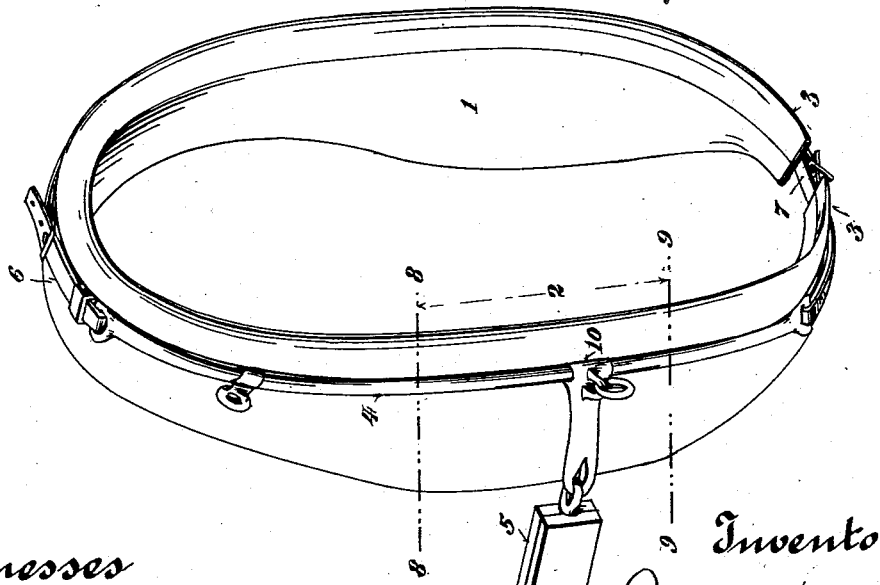
Witnesses
J. E. Marsh.
E. E. Knostman.
Inventor
Jay L. Torrey

UNITED STATES PATENT OFFICE.

JAY L. TORREY, OF EMBAR, WYOMING.

SELF-ADJUSTING HORSE-COLLAR.

SPECIFICATION forming part of Letters Patent No. 568,887, dated October 6, 1896.

Application filed May 14, 1894. Serial No. 511,092. (No model.)

*To all whom it may concern:*

Be it known that I, JAY L. TORREY, a citizen of the United States, residing at Embar, Fremont county, Wyoming, have invented a certain new and useful Improvement in Horse-Collars, consisting of a Self-Adjusting Horse-Collar, of which the following is a full, clear, and exact description, reference being had to the accompanying drawings, forming a part of this specification.

The objects of this invention are to produce a horse-collar which may be varied in size, both in length and width, so that it may be used upon small, medium, and large sized animals, and on which the draft-point may be adjusted with reference to the size of the animal upon which it is used.

The foregoing objects will be attained by the form of the construction of the horse-collar hereinafter described, and specifically pointed out in the claims.

In the accompanying drawings, which constitute a part of this specification, like reference-figures indicate corresponding parts.

Figure I is a perspective view of the front of the self-adjusting horse-collar, showing it as held in place, both with reference to length and width, for use on a medium-sized animal by hames of ordinary construction and indicating by the dotted lines 8 8 and 9 9 the approximate limits within which the draft-point 10 may be raised and lowered. Fig. II is a perspective view of the back of the collar, showing it with the lower ends lapped as it will be when adjusted in length and width to an animal having a neck smaller than the medium size, and showing in dotted lines its shape when adjusted to an animal having a medium-sized neck, and also when adjusted to an animal having a neck larger than the medium size. Fig. III is a vertical cross-section of one side of the collar, showing that the sides of the collar are substantially of a uniform size for a considerable portion of their length above and below the draft-point.

1 indicates the self-adjusting horse-collar, made in one section or continuous piece. It is made of the materials in general use for the making of horse-collars. It is so constructed that it is smaller in cross-section at the top than on the sides and so that the upper portion constitutes a pliable hinge, which will permit the separate sides of the collar to follow the alternate forward and backward movements of the shoulders of the animal when moving in a walk or other gait and permit the collar to be removed from the animal's neck. It is open at the bottom, as shown in Fig. I, and is not provided with any means for being fastened. It will be adjusted in length and width to the animal's neck and held in place by the hames 4 and hame-straps 6 and 7.

2 indicates that portion of each side of the collar which is the same size in cross-section throughout a considerable portion of each side, as shown in Figs. I and III. When the collar is adjusted in length and width to the shoulders of an animal smaller than the medium size, and in consequence the lower ends of each side of the collar are lapped, as shown in Fig. II, the draft-point, as it appears at 10 in Fig. I, will be raised by tightening the hame-strap 6 and loosening the hame-strap 7, so that 10 will be raised to approximately the dotted line 8 8. If, on the other hand, the collar should be used on an animal larger than the medium size, as indicated by the dotted line farthest from the collar in Fig. II, the draft-point would be lowered by loosening the hame-strap 6 and tightening the hame-strap 7, so that the draft-point would be lowered to approximately the dotted line 9 9. The draft-point can of course be adjusted by the same means to any position between the dotted lines 8 8 and 9 9. It is necessary that the draft-point should always be on a thick portion of the collar, to prevent injuring the animal's shoulder and to keep the trace 5 from chafing the side of the animal near its shoulder. This end is attained by having the collar substantially of a uniform size for a considerable portion of its length both above and below the ordinary draft-point.

3 indicates the lower end of each side of the collar, which is constructed of pliable material, so that one end may be lapped over the other, as shown in Fig. II, for the purpose of permitting the collar to be adjusted, both in length and width, to the shoulders of an animal of less than the medium size, or so placed that they may almost come in contact when adjusted to an animal of medium size, as shown by dotted lines in Fig. II, or slightly separated when adjusted to an animal larger than the medium size, as also shown in Fig. II. I prefer to make these pliable or flexible ends 3 by continuing the sheathing or cover part of the collar beyond the point where the stuffing or filling of the collar ends, the parts being held in place by stitching. These flexible or pliable ends 3 are necessary to prevent the animal from being choked or chafed by the lower ends of the hames and the lower hame-strap 7, and to prevent the flesh or hide of the animal from being caught between the open ends of the collar and being pinched or bruised should the parts of the collar be accidentally forced together while it is upon the neck of the animal. I deem these flexible or pliant ends an important feature of my invention. This adjustability of the collar, both in length and width, is of the greatest importance, because by it the owner of a number of animals, and the owners of young and growing animals, will be saved the great expense and trouble incident to having a collar of proper size for each animal's neck when poor and another when fat, since by the use of this collar they need to have only one of them for animals of all sizes and in all conditions.

4 indicates hames of ordinary construction. They are utilized in connection with hame-straps 6 and 7 to adjust the collar, with reference to its length and width, to the shoulders of animals of all sizes, by the alternate tightening and loosening of the hame-straps 6 and 7.

5 indicates the trace, which is connected with the hame on each side.

6 indicates the hame-strap which connects the upper ends of each side of the hames. By the tightening and lengthening of this strap in connection with the alternate lengthening and tightening of the lower hame-strap 7 the draft-point 10 of the hames may be raised or lowered.

7 indicates the hame-strap which connects the lower ends of the hames. In addition to its use in connection with the upper hame-strap 6, as explained above, it holds each side of the collar firmly against the neck of the animal—i. e., the collar is adjusted in width to the animal's neck. It is of great importance that the collar should be held securely and snugly against the sides of the animal's neck, since a collar when too short in length chokes the animal and when too loose in width sweenies it, both of which are cruel and destructive of the animal.

8 8 indicate the upper line of that portion of each side of the collar which is substantially of a uniform size for a considerable portion of its length above and below the ordinary draft-point 10.

9 9 indicate the lower line of that portion of each side of the collar which is substantially of a uniform size for a considerable portion of its length above and below the ordinary draft-point 10.

10 indicates the draft-point, that is, the point where the trace 5 is united with the hames 4. The draft-point should always be so adjusted as to be opposite the lower part of the animal's shoulder, so that such animal may the more readily withstand a backward pressure from the traces on each side of the collar.

I claim as my invention, and desire to secure by Letters Patent, the following:

1. A horse-collar made in one section with the opening at the bottom, the sides of which are flexibly united at the top and unsecured at the bottom, each side being substantially of a uniform size for a considerable portion of its length above and below the ordinary draft-point, and each of the lower ends being constructed of pliable material and closed, whereby the size of the collar may be varied, both in length and width, and the draft-point correspondingly changed, all substantially as described and for the purpose set forth.

2. A horse-collar made in one section with the opening at the bottom, the sides of which are flexibly united at the top and unsecured at the bottom, each side being substantially of a uniform size for a considerable portion of its length above and below the ordinary draft-point, and each of the lower ends being constructed of pliable material and closed, whereby the size of the collar may be varied, both in length and width, in combination with a pair of hames with adjustable fastenings at the top and the bottom, whereby the collar may be adjusted, both in length and width, and the draft-point raised or lowered, by adjusting the hame-fastenings, all substantially as described and for the purpose set forth.

In testimony whereof I have hereunto affixed my signature, in the presence of two witnesses, on May 11, 1894.

JAY L. TORREY.

Witnesses:
J. V. E. MARSH,
E. E. KNOSTMAN.